Feb. 23, 1937. W. O. W. LEE ET AL 2,072,040
ARTICLE TO FACILITATE BUSINESS ACCOUNTING
Filed March 16, 1936 2 Sheets-Sheet 1
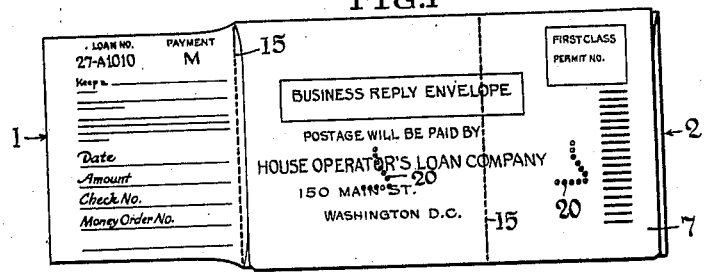
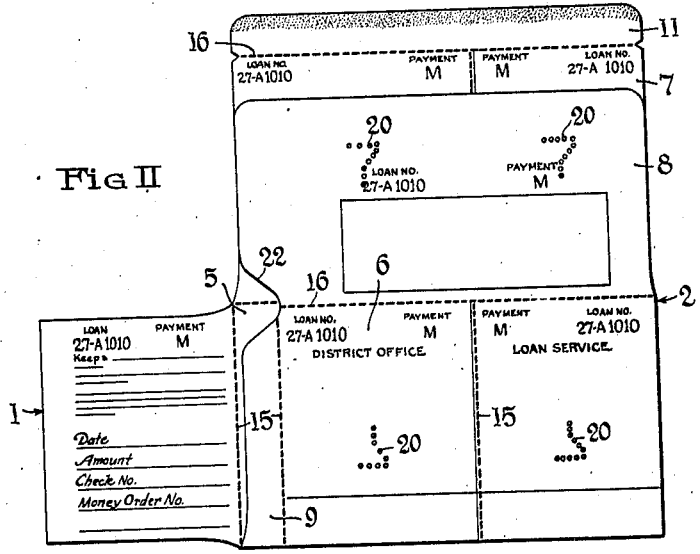
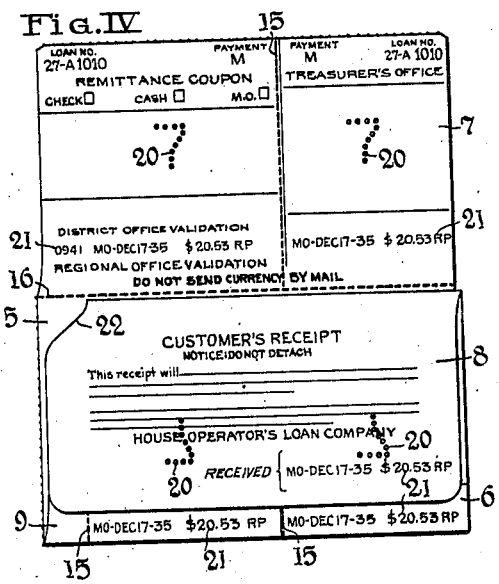
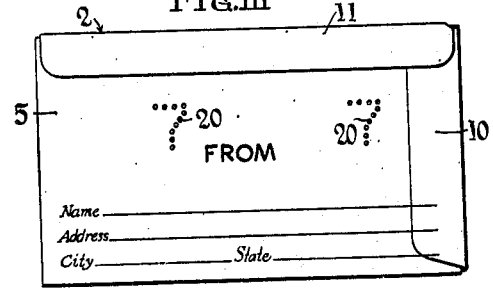

Patented Feb. 23, 1937

2,072,040

UNITED STATES PATENT OFFICE 2,072,040

ARTICLE TO FACILITATE BUSINESS ACCOUNTING

Walter O. W. Lee, Washington, D. C., and Montgomery O. Jones, Richmond, Va.; said Jones assignor to The Duplex Envelope Company, Inc., Richmond, Va., a corporation of Virginia Application March 16, 1936, Serial No. 69,196

15 Claims. (Cl. 283—1)

This invention relates to an improved article to facilitate business accounting, and is intended for use to simplify the making of payments or deposits to a collection agency. More particularly, it relates to a form structure which includes an envelope adapted to facilitate the handling and recording of payments when made either in person or by mail to a collecting agency.

In the preferred form of the invention, it is embodied in a book having a number of leaves, each leaf comprising a stub and a readily detachable, mailable envelope. The stub may be a permanent part of the book to serve as the depositor's record of payment. When detached from the stub, the envelope may be used to transmit the payment through the mail. In the system of accounting with which the invention is used, the envelope is intended to accompany each payment whether made by mail or in person. It consists of severable sections, into which it is separated by the collecting agency, the several sections being used as individual records of the particular transaction. The envelope preferably has one removable section to serve as the depositor's receipt when validated and detached by the collecting agency. Other detachable sections of the envelope may provide separate records for various offices or departments of the collecting agency, such as, a district office, the loan service department, and the treasurer's office. Another removable section of the envelope may conveniently serve as a remittance coupon for the collecting agency.

Each book embodying this invention may be given an individual account number, and this number may be carried by each stub and by each removable section of the envelope which is to serve as a record. As each book leaf corresponds to a particular payment or installment deposit, the leaves are preferably given symbols or indicia marking to indicate their sequence in a series of payments. Each book leaf is preferably of such character that the stub and all of the detachable record-serving sections in assembled undetached form may be provided with the individual account number in a single printing operation. Each envelope is also preferably of such construction that when opened by the collecting agency, all of the removable record-serving sections, before detachment, may be validated by a single operation of a validating machine. If desired, each book leaf may be perforated to show the cycle date or the day of the month when the payment corresponding to that particular book leaf is due.

The present invention, therefore, in addition to offering all of the advantages of the usual Xmas savings coupon and stub book, provides for handling of installment or budget payments, whether made by mail or in person.

One of the main objects of this invention is to provide a convenient and efficient means for making and/or mailing payments which, in its simplicity and ease of use will offer a definite appeal to depositors and thereby stimulate the desired regular and prompt payments.

Another object is to facilitate the handling and recording of deposits by providing a device which is useful in mailing deposits and which includes an envelope severable into a plurality of record-serving sections by a collection agency upon receipt of the envelope.

A further object is to provide a novel stub and mailable envelope combination.

It is also an object to provide a novel type of envelope.

Another object is to provide a novel blank for a combination stub and detachable envelope.

A further object is to provide a combination stub and mailable envelope which may be rapidly and economically manufactured from a one-piece rectangular sheet of paper or other suitable material.

A still further object is to provide an envelope with a closure flap, an inner flap, and a separable stub in addition to the envelope pocket, all of which are so relatively arranged that they may be simultaneously numbered in one operation of a printing mechanism.

Another object is to provide an envelope with a closure flap, and an inner flap in addition to the envelope pocket, which are so designed that all three parts may be stamped in a single stamping operation when the envelope closure and inner flaps are in the unfolded position.

A still further object is to provide an envelope with a cut-out portion at the juncture of two severable envelope sections to aid in the rapid and efficient separation of the sections.

Other objects and advantages will be apparent from the following detailed description of a preferred embodiment of the invention.

In the accompanying drawings, Fig. I is an elevational view of a book leaf embodying this invention and ready to be bound in book form.

Fig. II is an elevational view of the book leaf of Fig. I with the flaps of the envelope unfolded for one printing operation.

Fig. III is an elevational view of the rear of the envelope of Figs. I and II when detached from its stub and sealed for mailing.

Fig. IV is an elevational view of the envelope of Fig. III after it has passed through the mail and has been opened for a further printing operation.

Figs. V to IX are elevational views showing one side of each of five individual records obtained by separating the envelope, as shown in Fig. IV, into parts.

Fig. X is a plan view of a blank, from which the book leaf of Figs. I and II is made.

The accompanying drawings illustrate one form of the invention, and show a combination stub and envelope, to be assembled or bound in book-form, and useful in making payments to a collecting agency, the business of which e. g., is distributed geographically over a relatively large area. For illustration purposes, the collecting agency using the form of the invention shown in the drawings is one having one or more central or regional offices, local or district offices, a treasurer's office, a loan service department, and a department for posting remittances. This type of organization for handling loans to home owners is now well known.

The illustrated form of this invention, which is particularly suited to the needs of the above type of financing agency, comprises a stub 1 and envelope 2 (suitable for mailing payments) as shown in Fig. I. A number of these combinations of a stub and an envelope in the condition shown in Fig. I may be provided in book form by securing or binding the stubs 1 in a book cover.

These combinations of a stub and envelope are formed from a one-piece blank, which is shown in Fig. X. The blank of Fig. X, which may readily be cut from a single, rectangular sheet of paper, has two central envelope-pocket-forming panels 5 and 6 of similar size and shape, a closure-forming flap 7 similar in size and shape to panels 5 and 6, and a flap 8 which preferably is shorter in size than flap 7 or panels 5 and 6.

In order to complete the envelope-pocket when panels 5 and 6 are folded to lie against one another, as in Fig. II for example, panel 6 has, at opposite ends, a marginal portion 9 and a flap 10 to be secured, as by an adhesive, to opposite faces of panel 5 (see Figs. II and III). Panel 5 carries the stub 1, and flap 7 carries a sealing flap 11. To form the combination stub 1 and envelope 2 of Fig. I from the blank of Fig. X, panel 6 and flap 8 are folded to overlie panel 5 and flap 7, respectively, as in Fig. II, and marginal portion 9 is secured by adhesive or cement to the upper face of panel 5, while flap 10 is secured to the reverse face of panel 5 as by an adhesive (see Fig. III). Flaps 7 and 8 are now folded to overlie panel 6 (see Fig. I); and the face of flap 11 which is visible in Figs. II and X and carries adhesive lies against, without adhering to, the underside of the envelope 2 of Fig. I. The arrangement of the parts shown in Fig. I is now secured, and the combination stub 1 and envelope 2 is ready to become, for example, one of a number of leaves in a depositor's book.

The envelope 2 is constructed to be readily divisible to provide a number of separate parts (see Figs. V to IX), each of which serves as an individual record of the particular transaction in which the envelope 2 is used, as will be described more fully hereinafter. To facilitate this division of the envelope 2 and its separation from the stub 1, the blank from which they are formed is provided with a number of tearing lines 15, 16, which may be perforated or otherwise weakened. The tearing lines 16 have the additional function of serving as guide lines when the blank of Fig. X is folded to the form shown in Fig. I.

The blank of Fig. X is provided with marks or printing on its opposite faces prior to its being folded into a combination stub and envelope. In order that the arrangement of printing on the blank of Fig. X may be clear, it is noted that the Figs. I, III and VII to IX show the reverse side of the corresponding envelope parts of the blank in Fig. X. Stub 1, flap 8, (see Figs. II and IX), two sections of flap 7 (see Figs. V and VI), and two sections of panel 6 (see Figs. VII and VIII) are each provided on one of their faces with the notation "Loan No.", space being left below same to receive a number, and with the notation "Payment" over a symbol (such as a letter) which indicates the order of the combination stub and envelope in a series of such combinations. The right-hand section of flap 7 (see Figs. VI and X) and the two detachable sections of panel 6 (see Figs. II, VII and VIII) are provided respectively with the further notations of "Treasurer's Office", "District Office" and "Loan Service". Flap 8 below the notations "Loan No." and "Payment" also has a rectangular area for receiving a name and address. The reverse side of flap 8 (or the side shown in Figs. IV and X) has appropriate information serving to indicate that it is a receipt by the collecting agency. The left-hand section of flap 7 (see Figs. V and X) bears the notation "Remittance Coupon". This left section of flap 7 also has spaces identified by the notations "Check", "Cash", "M. O.", "District Office Validation", and "Regional Office Validation". The reverse faces of flap 7 and panel 5 as shown in Figs. I and III bear respectively the address of the regional office of the collecting agency and the sender's address.

Stub 1, as shown in Figs. I, II and X, is provided with appropriate information for the use of the depositor, and has spaces for the date on which a payment is made or mailed, the amount of the payment, the number of the check used in making the payment, and the number of a money order, if one is used for the payment.

As explained above, a group of the combinations of stub and envelope shown in Fig. I may be bound together in book form. Prior to this binding operation, each book leaf of the group to be bound together, is run through a printing press while in its open condition shown in Fig. II. In this condition of the envelope, flap 8 being somewhat shorter overlies only a part of flap 7, and the spaces immediately below the six notations, "Loan No." on stub 1, panel 6 and flaps 7 and 8 are now exposed to receive the same loan number indicia in a single operation of the printing machine. In this number, the first part "27" may indicate a particular state, the second part "A" may indicate a district office within that state, and the third part "1010" may indicate the number of the loan of that particular district office in that particular state.

When an individual opens an account with the collecting agency, he is presented with one of these books to assist him in making regular, periodical payments. If desired the envelopes 2 in the book may be perforated as at 20, with the day of the month on which payments are due. When a payment is about to become due, the depositor, if payment in person is inconvenient, detaches the appropriate envelope 2 from its stub 1, inserts his payment, seals flap 11 to panel 7

5 (see Fig. III), adds his name and address to the rear side of the envelope, and posts same. The depositor also makes a suitable record of his payment on the stub from which the envelope has been detached. The envelope goes forward to the regional office as its address is the one originally placed on the envelope.

When the envelope and the enclosed payment is received by the regional office, it is opened by separating flap 7 from flap 11 as is clearly shown in Fig. IV, and the receiving clerk notes in pencil on the "remittance coupon" (a part of flap 7) the amount of the payment received, and whether it is in the form of a check, cash, or money order. The payment is forwarded to the treasurer's office, while the complete envelope is sent to the validating department. The envelope in the condition shown in Fig. IV is put through a validating machine, which in one keyboard operation, prints or stamps the validation in five places on the envelope as shown at 21 in Fig. IV. In this validating operation, the "remittance coupon" receives the regional office machine sequence number; while the "remittance coupon" the "customer's receipt", and the records for the "Treasurer's Office", the "District Office", and the "Loan Service" department are each imprinted with a notation as to the form of payment, the date of receipt of the envelope and payment in the Regional Office, the amount of the payment, and the initials of the person who received the payment.

The envelope of Fig. IV is now divided along the tearing lines 15 and 16 to provide the five separate records shown in Figs. V to IX. Separation of the "customer's receipt" or flap 8 may be facilitated by providing a cut-out portion 22 in one edge of the envelope blank and at one end of the tearing line 16 between flap 8 and panel 6. The records of Figs. V to VIII are distributed among the various offices and departments identified on the records. The "customer's receipt" of Fig. IX is sent through a stencil or addressing machine for printing the depositor's address in the rectangular area shown in Fig. IX, inserted in a window envelope, and then mailed to the depositor or borrower.

The book of combined stubs and envelopes may also be used where payments are made in person at the district office of the collecting agency. In this case, the depositor presents his book and payment to the District Office, where the appropriate envelope is removed and the stub, left in the book, is stamped to show receipt of the payment. The district office validates the envelope in its validating machine which prints in the space of the "remittance coupon" over the notation "District Office Validation" the district office machine sequence number, the form of payment made by the depositor, the date of payment, the amount of the payment, and the initials of the person receiving the payment. The district office then forwards the entire envelope to the regional office which then validates and distributes the envelope parts as if the envelope had been mailed, as above, directly to the regional office by the depositor.

In the above described form of the invention, the envelope 2, while a part of the depositor's book, may be considered as a combined envelope and coupon capable of serving all the functions of the coupons of the conventional Xmas savings book which necessitates payment in person. The envelope characteristic of the present invention, however, offers the additional advantage of permitting the coupon, which is at the same time an envelope, to be used for making payments through the mail.

It is also clear that the invention provides other advantages. For example, the return receipt provided by flap 8 serves as a check for the depositor on the stub record, from which stub the envelope has been detached; and shows that the records of the regional office, whether the payment is made in person to the district office or by mail to the regional office, are in agreement with the depositor's records. The practice of the invention also insures accuracy in the records of both the district and regional offices.

While the above description of a form of this invention is made mainly with reference to a particular type of collecting agency, it is believed to be sufficient to indicate the general usefulness and applicability of this invention to business systems generally, which have to do with collecting and accounting money and where payments by a large number of customers are made at regular intervals, as in installment purchasing, etc.

Possible modifications and variations of the form of the invention illustrated in the drawings are also readily apparent; and it will be understood that the foregoing description and drawings are only illustrative, and that the appended claims are intended to cover such embodiments as are within the scope of the invention.

We claim:

1. In a book useful to facilitate the making of regular deposits or installment payments and to provide a convenient, systematic and duplicate record of such transactions, a book leaf comprising a stub to be bound into the book as a permanent part thereof and to serve as an individual's record, and an envelope having a pocket and being detachable from said stub to serve as a container for the individual's payment, said envelope having two detachable flaps extending from the mouth of the envelope pocket and constituting part of the envelope for mailing, said flaps being readily detachable from the envelope pocket and marked for use as separate records of the transaction in which the envelope is used.

2. An article as described in claim 1, in which one side of the envelope pocket is formed of at least one readily detachable section marked for use as an additional record of the said transaction.

3. In a book useful to facilitate the making of regular deposits or installment payments and to provide a convenient, systematic and duplicate record of such transactions, a book leaf comprising a stub to be bound into the book as a permanent part thereof and to serve as an individual's record, and an envelope having a pocket and being detachable from said stub to serve as a container for the individual's payment, said envelope having separate flaps at opposite sides of the mouth of the envelope pocket to overlie one of the outer sides thereof when the envelope is sealed for mailing, said flaps being readily detachable from the envelope pocket and marked to serve as separate records of the transaction in which the envelope is used.

4. In a book useful to facilitate the making of regular deposits or installment payments and to provide a convenient, systematic and duplicate record of such transactions, the combination with a stub to be bound into the book as a permanent part thereof and to serve as an individual's record, of an envelope detachable from said stub to serve as a container for the individual's payment and comprising an envelope pocket, a closure flap and a second flap, said second flap being smaller than said closure flap and underlying said closure flap in its closure forming position, said flaps and one side of the envelope pocket all having areas exposed to receive printing in a single printing operation when the closure flap is in open position.

5. In a book useful to facilitate the making of regular deposits or installment payments and to provide a convenient, systematic and duplicate record of such transactions, the combination with a stub to be bound into the book as a permanent part thereof and to serve as an individual's record, of an envelope readily detachable from said stub to serve as a container for the individual's payment and comprising an envelope pocket, a closure flap carried by said pocket at its mouth, and a sealing flap carried at the outer edge of said closure flap, said closure flap being of substantially the same size and shape as the envelope when sealed for mailing, said closure flap being bounded by weakened lines adjacent its opposite inner and outer edges to permit its ready separation from said sealing flap and said envelope pocket and being marked for use as at least one record of the transaction in which the envelope is used.

6. In a book useful to facilitate the making of regular deposits or installment payments and to provide a convenient, systematic and duplicate record of such transactions, the combination with a stub to be bound into the book as a permanent part thereof and to serve as an individual's record, of an envelope readily detachable from said stub to serve as a container for the individual's payment and comprising a pair of panels forming an envelope pocket and a flap to constitute a closure for the envelope pocket; one of said panels and said flap having weakened tearing lines adjacent their edges and also within their limits to permit ready separation of the panel and flap from the envelope and their division into a plurality of parts, said parts being marked for use as separate individual records, including a remittance coupon, and separate records for the treasurer's office, district office and loan service department of an agency receiving the envelope with payment.

7. An article as described in claim 6, in which the envelope is provided with an additional readily detachable flap marked for use as a customer's receipt and underlying said closure flap in its closure-forming position.

8. An envelope for commercial use comprising an envelope pocket with a closure flap and a second flap extending from opposite sides of the mouth of the envelope pocket, said second flap being smaller than said closure flap and underlying said closure flap in its closure forming position, said flaps and one side of the envelope pocket all having areas exposed to receive printing in a single printing operation when the closure flap is in open position.

9. An envelope for commercial use having a flap and a section of the envelope pocket readily detachable from each other and from the remainder of the envelope, the lines of said detachment being weakened and extending to a cut-out area in a corner of the envelope, said section being marked for use as a transaction record upon detachment.

10. A blank for a combination stub and envelope, a series of which are to be bound in the form of a book useful to facilitate the making of regular deposits or installment payments and to provide a convenient, systematic and duplicate record of such transactions, comprising two inner panels and two outer flaps, the two inner panels and one of the outer flaps being of substantially the same size and shape, said inner panels being foldable together to form an envelope pocket with the said last-mentioned outer flap constituting a closure therefor, the other of said outer flaps being somewhat smaller than said closure flap and underlying said closure flap in their folded position, one of said inner panels carrying at one side of the blank a flap to receive adhesive and to be secured to the other of said panels, said other panel carrying at the other side of said blank a detachable stub, and said closure flap carrying at its outer edge an envelope sealing flap.

11. A blank as described in claim 10 in which the panel carrying a flap at one side of the blank has a marginal portion at the opposite side of the blank to be secured to the other panel in forming the envelope pocket, the body portion of said panel having said marginal portion being bounded by weakened lines to permit its ready separation from said marginal portion and the remainder of the envelope.

12. In a combination stub and envelope book leaf of a book useful to facilitate the making of regular deposits or installment payments and to provide a convenient, systematic and duplicate record of such transactions wherein the stub as a permanent part of the book is to serve as an individual's record and the envelope as a detachable part of the book leaf is to serve as a combined envelope coupon for use in making said payments by mail or in person, an envelope comprising a pocket to serve as a container for the individual's payment, a detachable flap extending from one side of the mouth of the envelope pocket and bearing indicia identifying the flap as a separate record of the transaction in which the book leaf is used, and a closure flap extending from the opposite side of the mouth of the envelope pocket and foldable to a position to close the mouth of said envelope, said closure flap being of sufficient size to overlie substantially all of said detachable flap when said flaps are both folded against the envelope pocket.

13. In a combination stub and envelope book leaf of a book useful to facilitate the making of regular deposits or installment payments and to provide a convenient, systematic and duplicate record of such transactions wherein the stub as a permanent part of the book is to serve as an individual's record and the envelope as a detachable part of the book leaf is to serve as a combined envelope coupon for use in making said payments by mail or in person, an envelope comprising a pocket to serve as a container for the individual's payment, a closure flap extending from one side of the mouth of the envelope pocket and being of substantially the same size and shape as said envelope pocket, a sealing flap carried at the outer edge of said closure flap, and a detachable flap extending from the opposite side of the mouth of the envelope pocket and smaller in size than said closure flap and envelope pocket, said detachable flap lying between said envelope pocket and said closure flap when the envelope is sealed and bearing indicia identifying the flap as a separate record of the transaction in which the book leaf is to be used.

14. In a combination stub and envelope book leaf of a book useful to facilitate the making of regular deposits or installment payments and to provide a convenient, systematic and duplicate record of such transactions wherein the stub as a permanent part of the book is to serve as an individual's record and the envelope as a detachable part of the book leaf is to serve as a combined envelope coupon for use in making said payments by mail or in person, an envelope comprising two panels of substantially the same size and shape, one of said panels having a flap extending from one side and a marginal portion at its other side secured to the other of said panels, said flap carrying panel having a weakened line adjacent and extending along the inner boundaries of said flap and marginal portion and the bottom edge of the panel to provide for ready detachment of the panel portion within the limits of said weakened line, said detachable panel portion bearing indicia identifying it as at least one separate record of the transaction in which the book leaf is used, a closure flap foldable to close the mouth of said envelope pocket and of a size and shape to overlie substantially all of said indicia bearing panel portion in the folded position, and a sealing flap carried at the outer edge of said closure flap.

15. A blank for a combination stub and envelope, the stub to be bound into a book as a permanent part thereof and the envelope being detachable for mailing, said blank comprising two panels foldable together to form an envelope pocket, a flap carried at the outer edge of one of said panels and foldable to provide a closure for the mouth of said envelope pocket, one of said panels carrying at one side of the blank a flap to receive adhesive and to be secured to the other of said panels, said panels having marginal portions at the other side of the blank to be secured in face to face relation as by an adhesive in forming the envelope pocket, and a detachable stub extending from and carried by said last-named side of the blank.

WALTER O. W. LEE.
MONTGOMERY O. JONES.